Figure 1:
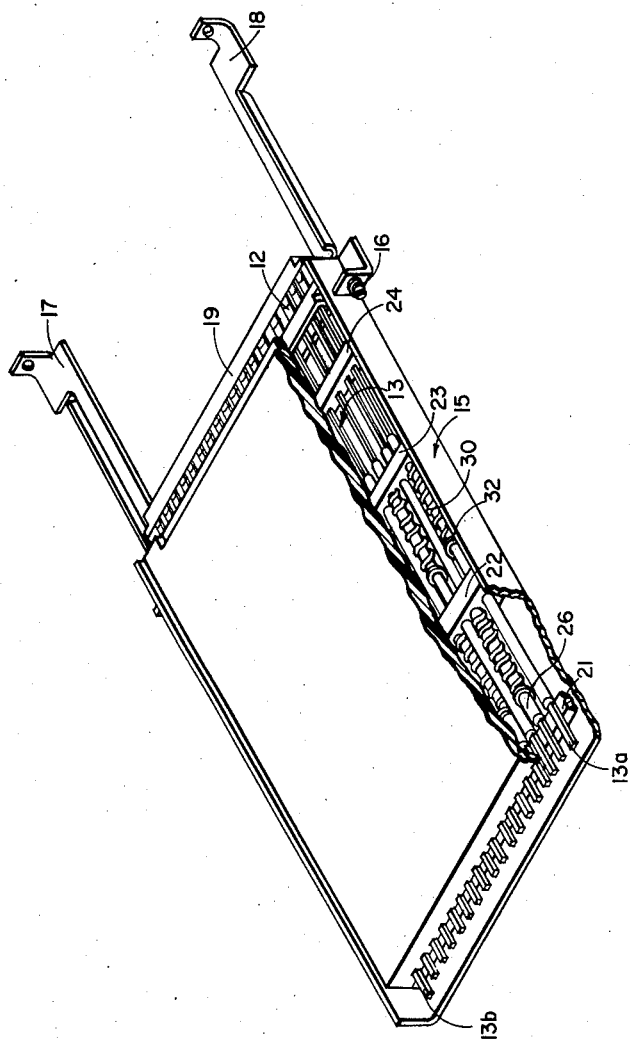

Jan. 10, 1961 W. H. STEINMAN ET AL 2,968,019
SELF-ADAPTIVE TEST FIXTURE FOR KEYED RECEPTACLE
Filed Jan. 4, 1960 2 Sheets-Sheet 1

INVENTORS
WILBERT H. STEINMAN
ARTHUR A. WHITE
BY
Edward A. Sokolski
AGENT

Jan. 10, 1961 W. H. STEINMAN ET AL 2,968,019
SELF-ADAPTIVE TEST FIXTURE FOR KEYED RECEPTACLE
Filed Jan. 4, 1960
2 Sheets-Sheet 2
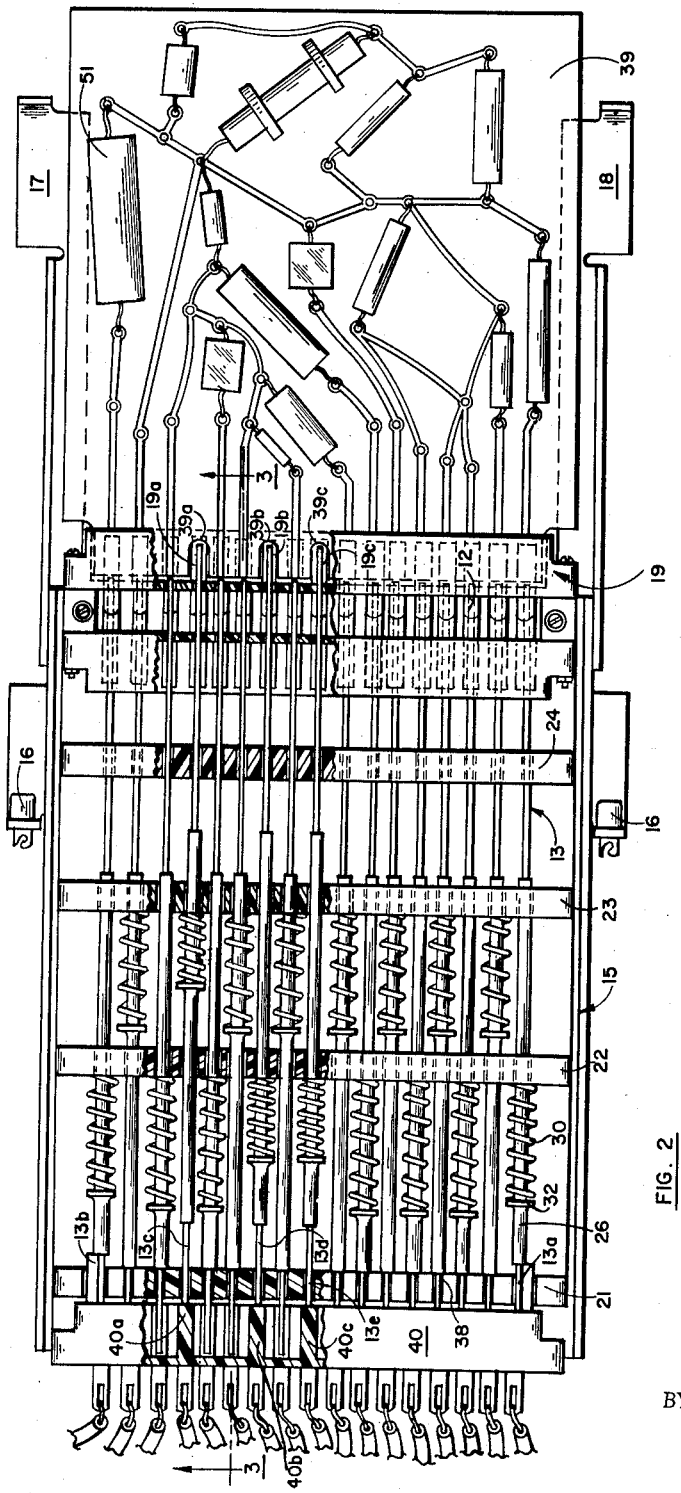
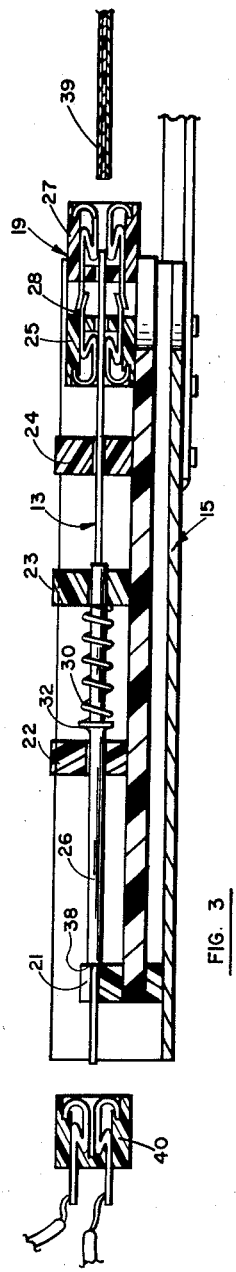
INVENTORS
WILBERT H. STEINMAN
ARTHUR A. WHITE
BY
AGENT 2,968,019

SELF-ADAPTIVE TEST FIXTURE FOR KEYED RECEPTACLE

Wilbert H. Steinman, Arcadia, and Arthur A. White, North Hollywood, Calif., assignors to North American Aviation, Inc.

Filed Jan. 4, 1960, Ser. No. 110

10 Claims. (Cl. 339—151)

This invention relates to a self-adaptive test fixture and more particularly to such a test fixture for use with plug-in modules which will automatically adapt itself to the keying configurations of such modules.

Plug-in modules are used quite extensively in electronic equipment to conserve space and to facilitate replacement of individual circuits within a system. Such plug-in modules may, for example, take the form of printed circuit boards with components mounted thereon which are properly interconnected, each of these printed circuit boards fitting into a separate mating receptacle attached to the associated equipment. To assure that modules are not plugged into improper receptacles, which would result in improper operation and might cause damage to the module components, the modules and receptacles are generally "keyed" in some fashion so that each module can fit only into its proper mating receptacle. Such a keying arrangement might comprise a combination of blocked contacts in the receptacle with corresponding grooves in the associated plug-in module, a unique such keying arrangement being utilized for each module and receptacle.

It is often desirable to make voltage and resistance measurements on a module while it is operating in the associated equipment. Due to the compact construction of such equipment it is often difficult or impossible to make such measurements without somehow removing the plug-in unit from its normally mounted operating position and making the proper interconnections between the plug-in receptacle and the contacts on the removed plug-in module. Such interconnections have in the past been made by an appropriate cable having a plug on one end which will mate with the receptacle in the associated equipment and a receptacle on the other end identical with the one mounted in the associated equipment which will mate with the plug-in contacts in the module. Where the receptacles and modules are keyed, a separate test cable would be required for each one of the differently keyed receptacles and modules. In a large complicated piece of equipment, this might necessitate an impractically large number of separate test cables to properly check out the equipment. In addition, such a test cable provides no rigid support for the module under test and requires that a table or test support be made available to support the unit under test.

The device of this invention overcomes these shortcomings first by providing a test fixture which automatically adapts itself to the keying configuration of the particular receptacle and plug-in module to be tested. This means that a single such test fixture can be utilized to check out all of the differently keyed but otherwise similar type plug-in modules in one or several equipments. The device of this invention will assume the keying configuration of the receptacle into which it is plugged and in turn will transfer this same keying configuration to its normally non-keyed receptacle. In addition, the test fixture of the device of this invention, when plugged into the receptacle in the associated equipment, will provide a rigid support for the plug-in module to be tested.

It is therefore an object of this invention to provide an improved test fixture for use with plug-in units.

It is a further object of this invention to provide a test fixture for use with keyed plug-in receptacles and associated modules which will automatically adapt itself to the keying configuration of such receptacles and modules.

It is another object of this invention to provide a test fixture which will rigidly support a unit to be tested external of the associated equipment.

It is still a further object of this invention to provide a self-adaptive test fixture which can be utilized with a great number of differently keyed receptacles and plug-in units.

It is still another object of this invention to facilitate the testing of compactly mounted plug-in units.

Other objects of this invention will become apparent from the following description taken in connection with the accompanying drawings in which Fig. 1 is a perspective view with a cutaway section of a preferred embodiment of the device of the invention;

Fig. 2 is a plan view with the top cover removed and with a cutaway section of the preferred embodiment shown in Fig. 1 as operatively interconnected with associated equipment; and Fig. 3 is a cross-section view with the module and equipment receptacle detached of the embodiment of Fig. 2 taken along a plane as indicated by the line 3—3 in Fig. 2.

The device of the invention comprises a plurality of conductor rods having a continuous electrical path between two opposite ends thereof. These conductor rods are slidably mounted on support means. An electrical contact receptacle is mounted on the support means so that its contacts will receive one end of each of the conductor rods and make electrical connection therewith. The opposite ends of the conductor rods are positioned so that they will fit into a keyed contact receptacle in associated equipment. Each of these conductor rods is urged away from the receptacle mounted on the support means by spring means, the motion of the rods in this direction being constrained by stop means fixedly attached to the support means. When the free ends of the conductor rods are plugged into the keyed contact receptacle in the associated equipment, those rods opposite keyed portions of the receptacle will be pushed by these keyed portions counter to the constraining action of the spring means, the opposite end of each of these rods so pushed being forced forward into the corresponding contact in the support mounted receptacle. Each of the rods so pushed will act as a plunger to provide a keying block in its associated contact.

Referring now to Fig. 1, a preferred embodiment of the invention is illustrated in perspective view. Conductor rods 13 are slidably mounted on support 15 fitting through respective apertures in cross members 21, 22, 23 and 24 which form a part of the support 15. The two end conductor rods 13a and 13b extend out further than the other rods and are a little wider. These end rods 13a and 13b will first engage the receptacle and properly locate the conductor rods of the device therein. Each of the conductor rods 13 should have a continuous conductive path running along its entire longitudinal dimension. These rods may be fabricated entirely of conductive material or they may comprise a nonconductive base, such as, for example of plastic with a conductive coating thereon. Each of the rods 13 has a nonconductive sleeve 26, which may be of plastic, fixedly attached thereto, the ends of these sleeves abutting against the end of member 21 thereby limiting the motion of the rods in the direction of the abutment. A spring 30 is slidably mounted on each of the conductor rods in concentric relationship thereto, one end of each of these springs abutting against a raised portion 32 fixed to each of the sleeves, the other end of each of these springs abutting against one side of either member 22 or member 23 depending upon the position of the spring. The springs 30 are mounted so that alternate springs will abut against member 22 and member 23 respectively. Such staggering of the springs tends to avoid interference therebetween, especially where the conductor rods are spaced closely together.

A nonkeyed connector 19 is fixedly mounted on support 15, one end of each of connector rods 13 making electrical contact with a respective one of the contacts in receptacle 19. Each of the connector rods can be moved to effectively block an associated contact in receptacle 19 by the application of force on the opposite end thereof against the urging action of spring 30. Each of the contacts in receptacle 19 has an exposed terminal 12, Fig. 1, which can be used for making electrical measurements. Guides 17 and 18 are fixedly attached to support 15. These guides may be used to support the module under test. Fasteners 16 (also see Fig. 2) may be used to attach the test fixture to appropriate receptacles in the equipment with which it is utilized.

Referring now to Fig. 2, the preferred embodiment of the invention with the top cover removed is shown as operatively connected to a plug-in module under test and a keyed test receptacle. Plug-in module 39 which may as illustrated be a printed circuit board with interconnected components 51 mounted thereon is plugged into receptacle 19. The ends of the conductor rods opposite to the ends connected to receptacle 19 are in turn plugged into receptacle 40 which is normally mounted in the associated equipment. (In normal use of module 39 it is directly plugged into receptacle 40.) As can be seen, receptacle 40 has three of its contacts blocked by polarizing ribs or inserts 40a, 40b and 40c so that they will not receive a conductor rod. It is to be noted that the blocked contacts of receptacle 40 correspond to the positions of indentations 39a, 39b, and 39c on the plug-in module whereby the spacing of the blocked contacts and of the module indentations provide a "code" or key which insures location of each module in its proper receptacle. The conductor rods 13c, 13d, and 13e which strike the blocked contact portions of receptacle 40 are urged backwards against the action of corresponding springs 30 so that their opposite ends in turn are forced into the respective contact portions 19a, 19b, and 19c of receptacle 19 thereby causing these corresponding receptacle contacts 19a, 19b, and 19c to become blocked. As can be seen, these blocked portions 19a, 19b, and 19c receive the indentations 39a, 39b, and 39c respectively in the plug-in module and are thus keyed to mate with the module 39. In this manner, receptacle 19 is keyed in accordance with the keying of receptacle 40 so that it will only receive the proper mating module and will reject all others, thereby preventing the insertion of the wrong module into the test fixture.

Referring now to Fig. 3, which is a cross-sectional view taken along the line 3—3 indicated in Fig. 2, the details of a conductor rod with its associated components detached therefrom are illustrated. The conductive coating may comprise two separate sections to provide a double electrical contact or may be a single contact portion. Fixedly attached to each conductor rod 13 is a sleeve 26 fabricated of insulating material. Slidably mounted on this sleeve and concentric thereto is a spring 30. One end of spring 30 abuts against a face of member 23 which is fixedly attached to support 15 while the other end of this spring abuts against projection or collar 32 fixed to the sleeve 26. Spring 30 will therefore provide an urging force against projection 32 to drive sleeve 26 and the attached conductor rod 13 until the end face 38 of sleeve 26 abuts against member 21 of support 15. Sleeve 26 and conductor rod 13 are slidably mounted in apertures formed in members 21, 22, 23, and 24 and slidable between portions of contact 28. Portions 25 and 27 of receptacle 19 which are fabricated of insulating material hold contact 28 which may be swaged thereto. It can readily be seen that if a force is applied against the end of conductor rod 13 inserted in receptacle 40, rod 13 will be moved axially so that the end of this rod inserted in contact 28 will eventually block this contact. In this manner, the receptacle 19 is keyed in accordance with the keying of receptacle 40 into which the other ends of the conductor rods are inserted. Contact is also provided between the contacts in receptacle 40 into which the conductor rods 13 are inserted and the associated contacts 28 of receptacle 19.

The device of this invention thus provides a simple, yet effective self-adaptive test fixture which will automatically adapt itself to operate with a great number of similar type but differently keyed plug-in receptacles and modules. It may be used with parallelly arranged contacts and modules, as illustrated in the preferred embodiment, or with plug-in modules and receptacles with their contacts arranged in any desired configuration.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A self-adaptive fixture for use in testing plug-in modules, each of said modules being keyed to mate with a separate correspondingly keyed plug-in receptacle in associated equipment, comprising a plurality of conductor rods, support means for slidably supporting said conductor rods, a nonkeyed plug-in electrical receptacle fixedly mounted on said support means, said conductor rods being positioned to mate with and make slidable electrical contact on one of the ends thereof with the contacts of said nonkeyed receptacle, the other of the ends of said rods being positioned to mate with the contacts of any one of said keyed receptacles in said associated equipment, and means for urging said conductor rods towards said keyed receptacle, whereby when said conductor rods are inserted in said keyed receptacle electrical connections are provided between corresponding contacts in said any one of said keyed and said nonkeyed receptacles and said nonkeyed receptacle effectively becomes keyed in accordance with the keying of said keyed receptacle.

2. The device as recited in claim 1 wherein said means for urging said conductor rods comprises a plurality of springs, a separate spring being slidably mounted externally of and concentric to each of said conductor rods.

3. The device as recited in claim 1 and further comprising a nonconductive sleeve fixedly attached to each of said conductor rods, each of said sleeves having a projection therein and wherein said means for urging said rods comprises a plurality of springs, a separate one of each of said springs being slidably mounted externally concentric with a separate one of said sleeves, one end of each of said springs abutting against a respective one of said sleeve projections, the other ends of said springs abutting against said support means.

4. In a self-adaptive test fixture for testing plug-in modules, each of said modules being grooved to mate with a receptacle in associated equipment having blocked contacts corresponding to said groove positions, a support, a plurality of conductor rods slidably mounted on said support, said rods having at least a single conductive portion running along the entire longitudinal dimension thereof, an electrical receptacle fixedly mounted on said support, said receptacle having contacts positioned similarly to the contacts of said receptacle in said associated equipment, one end of each of said conductor rods connecting to a separate one of said contacts of said support mounted receptacle in slidable mating relationship therewith, a sleeve fixedly attached to each of said conductor rods, each of said sleeves having a projection thereon, a spring slidably mounted on each of said sleeves in externally concentric relationship thereto, one end of each of said springs abutting a surface of said support, the other end of each of said springs abutting against the projection on its associated sleeve, one end of each of said sleeves abutting against said support, and guide means fixedly attached to said support for supporting said modules, whereby when said test fixture is plugged into said receptacle in associated equipment, each of said blocked contacts in said associated equipment receptacle forces the conductor rod opposite it into the associated contact on said support mounted receptacle to block said associated contact, said support mounted receptacle thereby assuming the keying configuration of said associated equipment receptacle.

5. A self-adaptive test fixture for use in testing electronic plug-in modules, each of said modules being keyed to mate with a separate correspondingly keyed plug-in receptacle in associated equipment, each of said modules having a plurality of electrical contacts adapted to connect to corresponding contacts in one of said receptacles, comprising a plurality of conductor rods having a continuous electrical path between two opposite ends thereof, support means for slidably supporting said conductor rods, a nonkeyed plug-in electrical receptacle fixedly mounted on said support means, said nonkeyed receptacle having contacts positioned similarly to the contacts of said receptacles in said associated equipment, said conductor rods being positioned to mate with and make slidable electrical contact on one of said ends thereof with the contacts of said nonkeyed receptacle, the other of said ends of said rods being positioned to mate with the contacts of any one of said keyed receptacles in said associated equipment, and means for urging said conductor rods away from said nonkeyed receptacle, whereby when said conductor rods are inserted in said any one of said keyed receptacles, electrical connections are provided between corresponding contacts in said one of said keyed and said nonkeyed receptacles and said nonkeyed receptacle effectively becomes keyed in accordance with the keying of said one of said keyed receptacles.

6. In combination, a plug-in electronic module having a plurality of electrical contacts; an electrical receptacle having a plurality of contacts adapted to mate with said module contacts, said module and said receptacle being correspondingly keyed to provide a unique contact mating relationship; and a self-adaptive test fixture comprising a support, a plurality of conductor rods slidably mounted on said support, said conductor rods having a conductive portion running along the longitudinal dimension thereof between the extreme ends of said rods, a nonkeyed electrical receptacle having contacts positioned similarly to the contacts of said keyed receptacle fixedly mounted on said support, one of said extreme ends of each of said conductor rods connecting to a separate one of the contacts of said nonkeyed receptacle in sliding mating relationship therewith, the other of said extreme ends of said conductor rods mating with the contacts of said keyed receptacle, means for urging said conductor rods towards said keyed receptacle, said conductor rods being positioned in accordance with the keying configuration of said keyed receptacle, said electronic module being plugged into said nonkeyed receptacle, whereby an electrical connection is provided through said conductor rods between each corresponding contact in said keyed and nonkeyed receptacles and said nonkeyed receptacle assumes the keying configuration of said keyed receptacle to mate with said module.

7. The device as recited in claim 6 wherein said keyed receptacle is keyed by means of preselected blocked receptacle contacts therein and said module is keyed by means of grooves therein, each of said grooves being positioned to mate with a separate one of said blocked contacts, said conductor rods opposite said blocked contacts being pushed thereby to block the corresponding contacts of said non-keyed receptacle.

8. In combination, a plug-in electronic module having a plurality of electrical contacts; a keyed electrical receptacle having a plurality of contacts adapted to mate with said module contacts, said receptacle having preselected contacts thereof blocked, said module having grooved portions corresponding to said blocked receptacle contacts and thereby adapted to mate therewith; and a self-adaptive test fixture comprising a rigid support, a plurality of conductor rods slidably mounted on said support, said conductor rods having a conductive portion running along the longitudinal dimension thereof between the extreme ends of said rods, a nonkeyed electrical receptacle having contacts positioned similarly to the contacts of said keyed receptacle fixedly mounted on said support, one of said extreme ends of each of said conductor rods connecting to a separate one of the contacts of said nonkeyed receptacle in sliding mating relationship therewith, the other of said extreme ends of said conductor rods mating with the contacts of said keyed receptacle, spring means for urging said conductor rods towards said keyed receptacle, the conductor rods positioned opposite the blocked contacts of said keyed receptacle being urged against the action of said spring means to block the corresponding contacts of said nonkeyed receptacle in accordance with the configuration of said keyed receptacle, said electronic module being plugged in to said nonkeyed receptacle, and guide means fixedly attached to said support for supporting said module, whereby electrical connection is provided through said conductor rods between each corresponding contact in said keyed and nonkeyed receptacles and said nonkeyed receptacle assumes the keying configuration of said keyed receptacle to mate with said module.

9. The device as recited in claim 8 and additionally comprising a nonconductive sleeve fixedly attached to each of said conductor rods, each of said sleeves having a projection thereon, and wherein said spring means comprises a separate spring positioned externally concentric with each of said sleeves, one end of each of said springs abutting against the projection on a respective one of said sleeves, the other end of each of said springs abutting against said support.

10. The device as recited in claim 9 wherein said sleeves and springs are alternately staggered, alternate springs being aligned with each other.

References Cited in the file of this patent

UNITED STATES PATENTS 2,210,418 Larson Aug. 6, 1940

OTHER REFERENCES

De Jur: Electronic Design, September 17, 1958, page 79.